United States Patent
Keller

[15] 3,664,107
[45] May 23, 1972

[54] RAKE TOOTH MOUNTING

[72] Inventor: Arthur H. Keller, Western Springs, Ill.

[73] Assignee: International Harvester Company, Chicago, Ill.

[22] Filed: Mar. 9, 1971

[21] Appl. No.: 122,405

Related U.S. Application Data

[63] Continuation-in-part of Ser. No. 862,853, Oct. 1, 1969, abandoned.

[52] U.S. Cl. .................................................56/400, 56/377
[51] Int. Cl. ............................................................A01d 77/00
[58] Field of Search ..........................56/377, 400, 365, 366

[56] References Cited

UNITED STATES PATENTS

| | | |
|---|---|---|
| 2,432,653 | 12/1947 | Bloom ........................................56/400 |
| 2,607,182 | 8/1952 | Hill ..............................................56/400 |
| 2,722,799 | 11/1955 | Cooley ........................................56/400 |
| 3,186,153 | 6/1965 | Breed ..........................................56/400 |
| 3,401,515 | 9/1968 | Fishbaugh ..................................56/400 |

*Primary Examiner*—Russell R. Kinsey
*Attorney*—Floyd B. Harman

[57] ABSTRACT

In a wheel rake, a mounting for a rake tooth structure on the wheel which also serves to secure a wheel shield to the wheel comprising a clip having a tooth mounting portion positionable on the periphery of the wheel and an inwardly extending flange with a projection thereon functioning to indent the fiberboard shield as the clip is drawn up against the rim of the wheel by a securing bolt.

14 Claims, 16 Drawing Figures

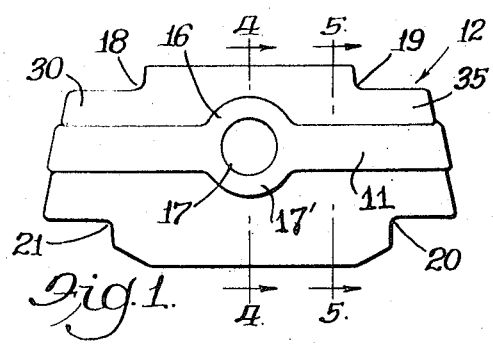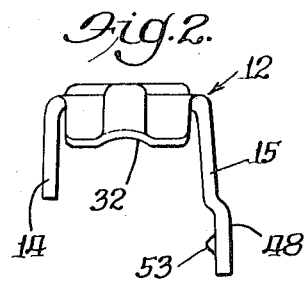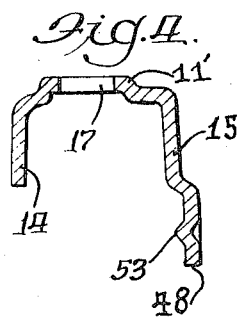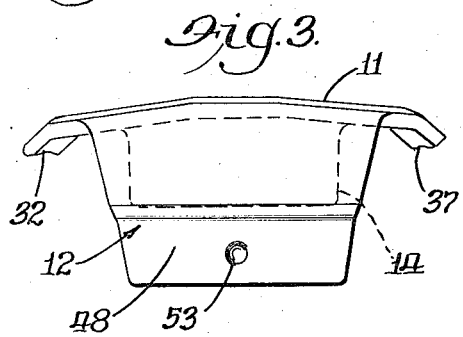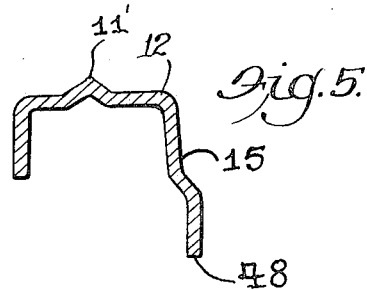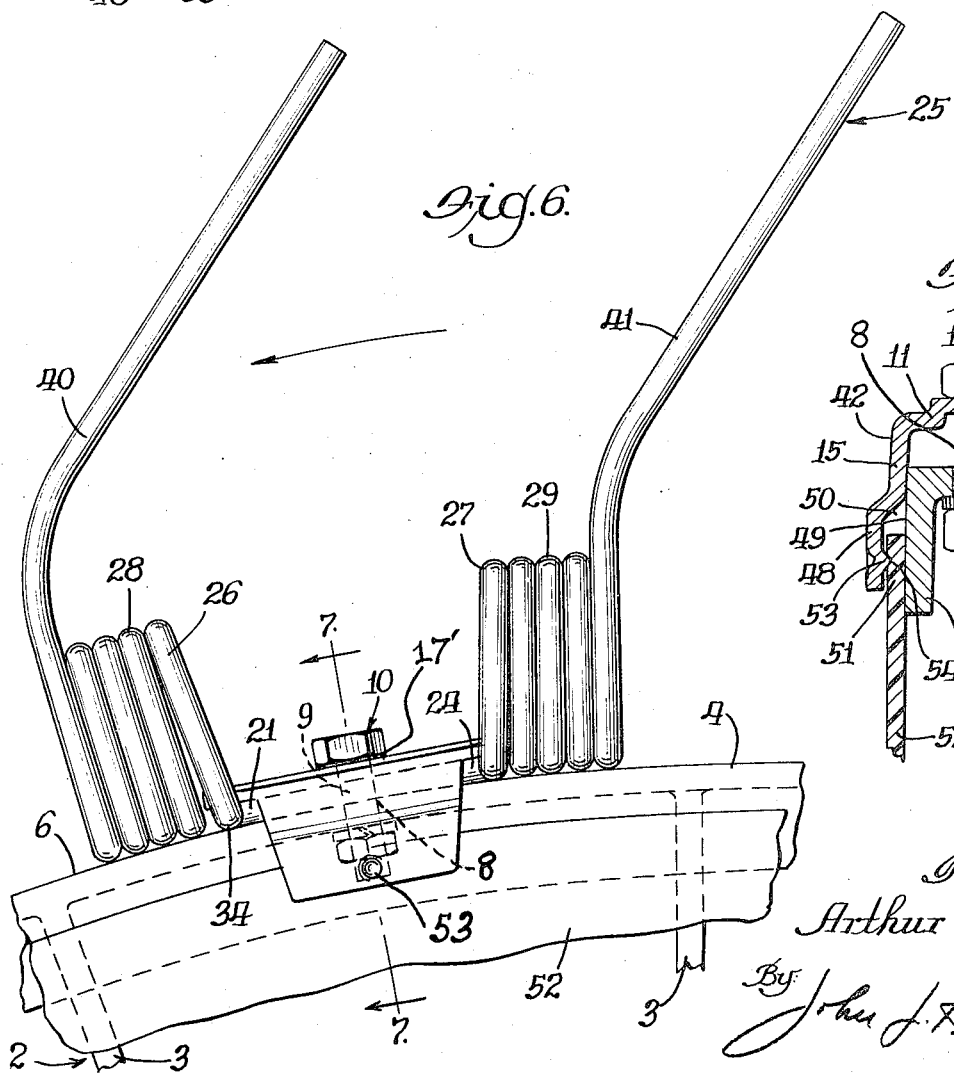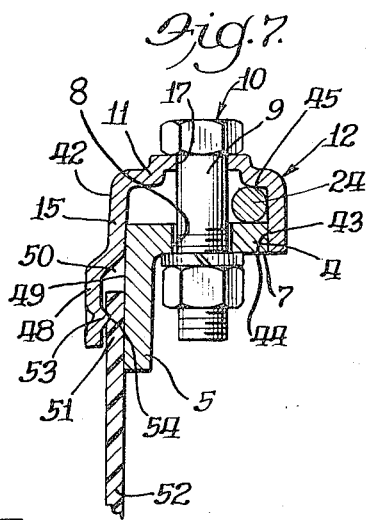

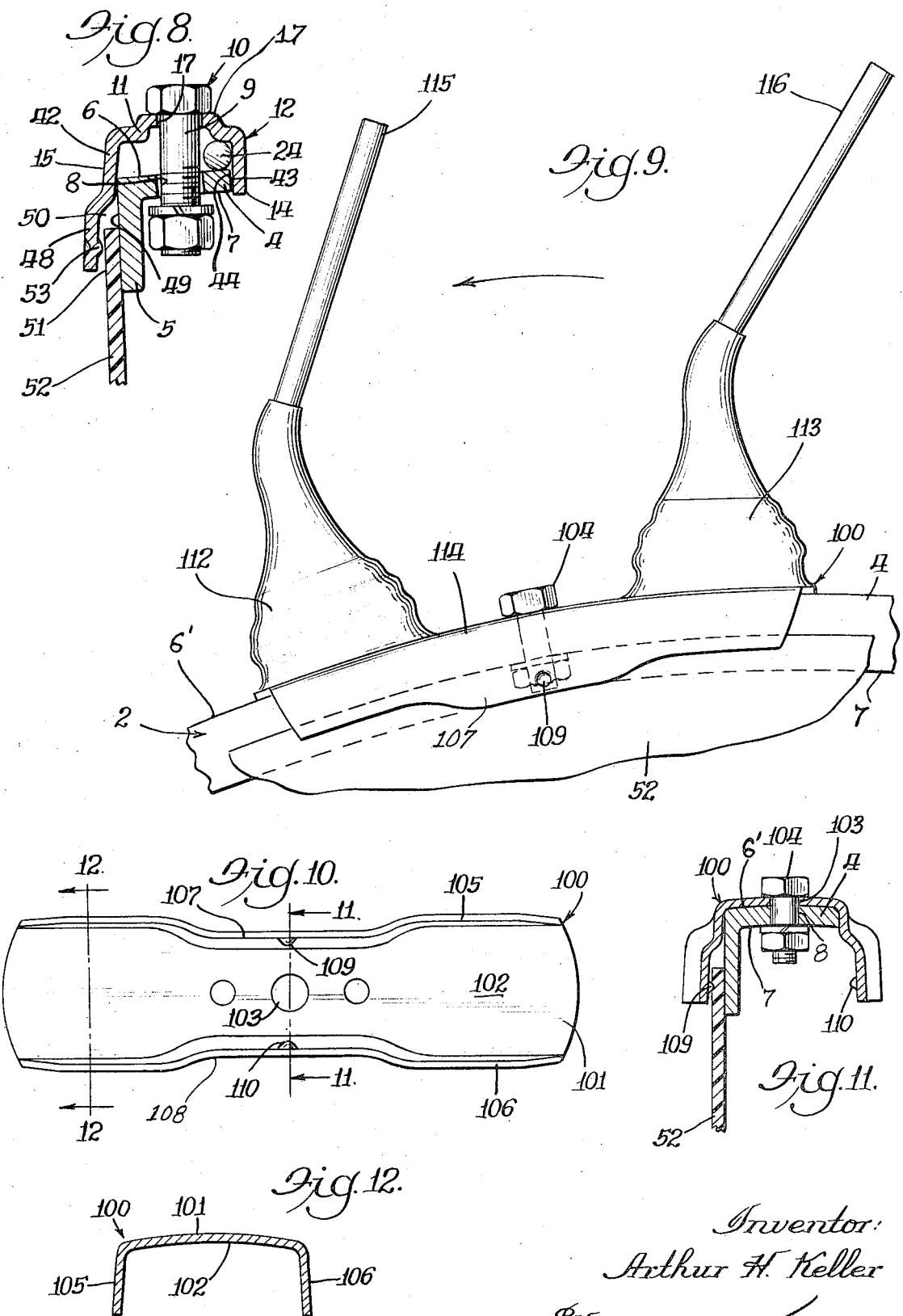

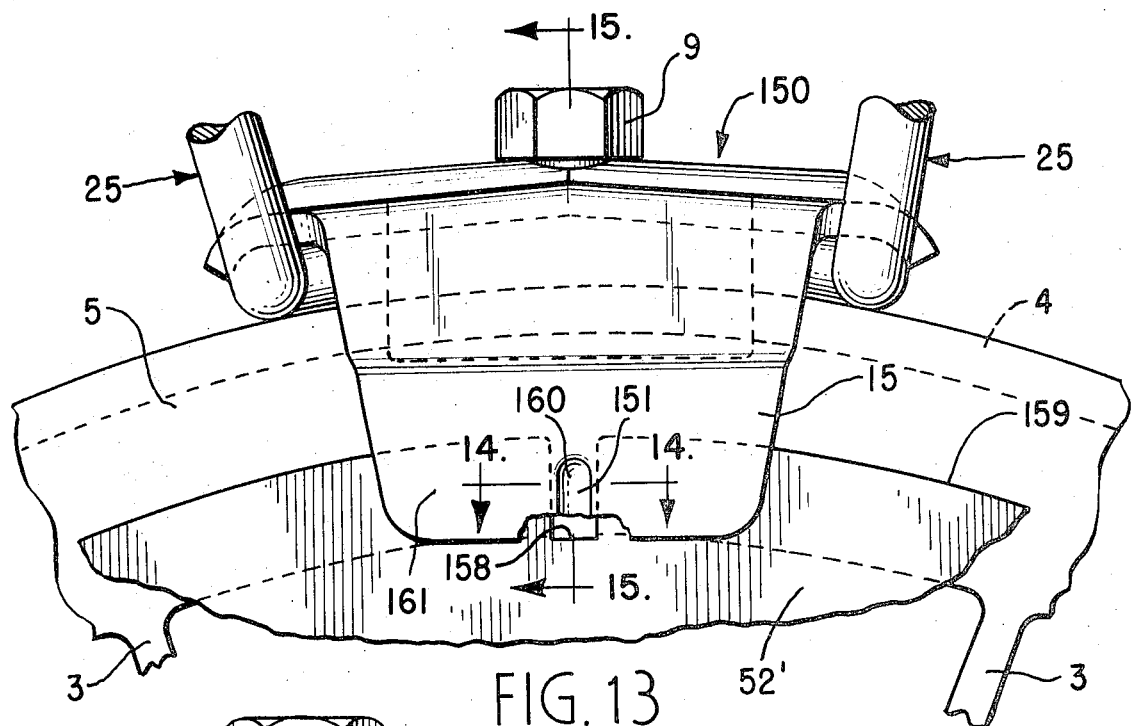
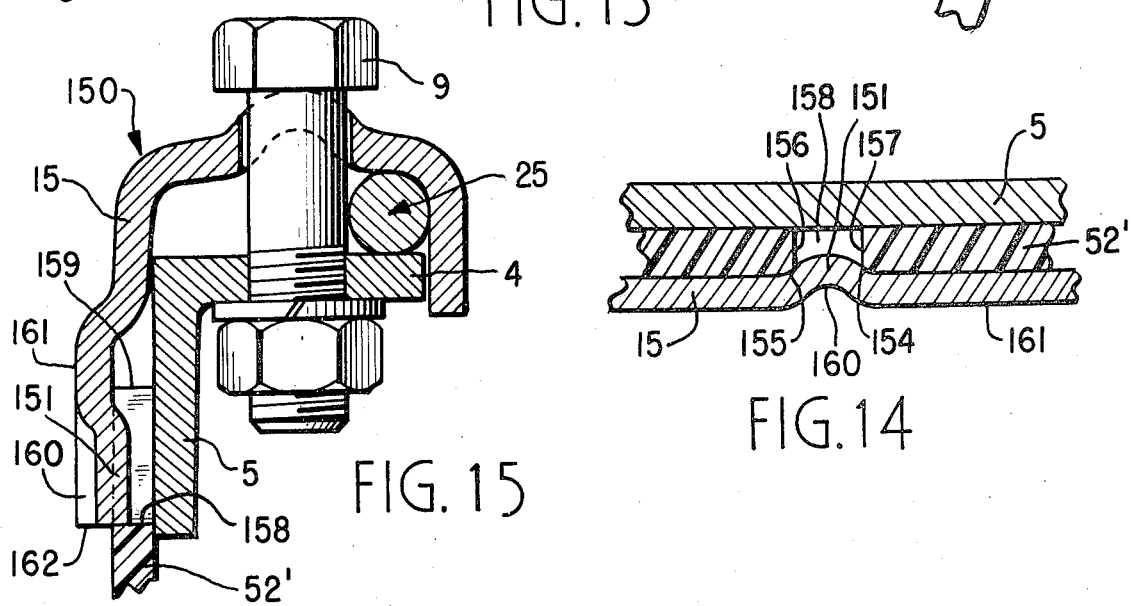
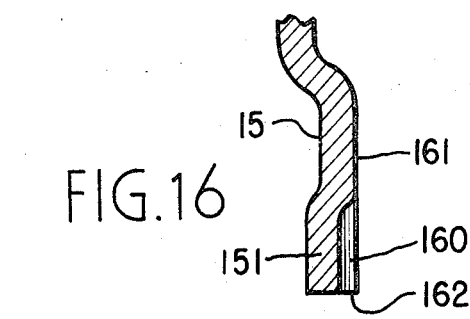

RAKE TOOTH MOUNTING

CROSS REFERENCE TO OTHER APPLICATIONS

This application is a continuation-in-part of my U.S. Pat. application Ser. No. 862,853 filed Oct. 1, 1969 and now abandoned, for RAKE TOOTH MOUNTING.

DISCUSSION OF THE PRIOR ART

Various clips have been used heretofore for the purpose of mounting rake teeth on the periphery of the rim of a skeletal type wheel of a wheel rake. The structures heretofore employed for securing the plastic for composition board which serves as a shield disposed in front of the skeletal spoked structure of the wheel, comprised providing a series of holes in the board and securing the board to associated structure on the wheel by means of nut and bolt assemblies. Such securement is not only time consuming and requires drilling the holes and also fastening and handling the bolt and nut assemblies but also because the board has a tendency to rotate relative to the supporting wheel the openings for the bolts wallow out to such an extent that the board falls off and if not the board develops fracture cracks and breaks apart.

SUMMARY OF THE INVENTION

This invention is directed to a novel device which not only serves to mount the teeth on the periphery of such a wheel but also wherein a flange is provided on the clip, which when it is tightened to the rim of the wheel causes a projection on the flange to indent the shield board and hold it tightly against a radial flange of the wheel.

The more specific object of the invention is to provide a novel mounting for the teeth of the wheel rake, the mounting comprising a body structure adapted to be positioned over the rim of the wheel and having an aperture which registers with a corresponding aperture in the rim for admitting a nut and bolt assembly therethrough loosely so as to accommodate the tilting of the body portion and thereby providing space to admit the shield between a radial flange of the rim and overlapping flange on the mounting member, the bolt adapted to be tightened to draw up the flange which has a projection to pierce the shield and hold it in place.

These and other objects of the invention will become more apparent from the specification and drawings, wherein:

FIG. 1 is a plan view of the novel mounting clip;

FIG. 2 is a side elevation thereof;

FIG. 3 is a front view thereof;

FIG. 4 is a sectional view taken substantially on the line 4—4 of FIG. 1;

FIG. 5 is a sectional view taken substantially on the line 5—5 of FIG. 1;

FIG. 6 is an enlarged side elevational view of the clip and tooth structure mounted on a rake wheel fragmentally shown in FIG. 7;

FIG. 7 is a sectional view taken substantially on the line 7—7 of FIG. 6;

FIG. 8 is similar to FIG. 7 showing the parts preparatory to assembly;

FIGS. 9 through 12 illustrate a modified form of clip, FIG. 9 being a fragmentary enlarged side elevational view showing the wheel with fingers mounted thereon;

FIG. 10 being the bottom view of the clip;

FIG. 11 being a cross sectional view thereof taken substantially on the line 11—11 of FIG. 10;

FIG. 12 being a sectional view taken substantially on the line 12—12 of FIG. 10;

FIG. 13 is a side elevational view of another modification with the rake wheel fragmentarily shown;

FIG. 14 is a cross sectional view taken on line 14—14 of FIG. 13;

FIG. 15 is a cross sectional view taken substantially on line 15—15 of FIG. 13; and FIG. 16 is a section taken substantially on line 16—16 of FIG. 14.

EMBODIMENT OF FIGS. 1–8

Describing the invention in detail and having particular reference to the structure shown in FIGS. 1 through 8 there is shown a skeletal rake wheel generally designated 2 which includes the usual hub-connected spokes 3 and an annular peripheral rim 4 with an inwardly extending radial flange 5 which is formed along one edge of the rim 4. The rim 4 provides an external annular surface 6 and an internal annular surface 7 and there are provided a plurality of uniformly spaced radial openings or bolt holes 8. These openings 8 each receive a shank 9 of a bolt 10, therethrough which shank extends through the body portion 11 of a clip generally designated 12.

The clip or mounting element 12 comprises on the body or base 11, which is essentially arcuate in side elevation as best seen in FIG. 3, at its rear edge intermediate its ends a relatively short and narrow depending flange or lip 14 and at its front edge a front guide and panel securing flange 15.

It will be noted that the body portion 11 is provided with a longitudinal offset rib 11' medially thereof and an annular offset head 17' about opening 17 to stiffen the structure.

The body portion is formed intermediate its front and rear edges with an upset rib construction 16 which rigidifies the body portion longitudinally thereof the upset rib being continued in the form of a raised embossment 17' about the opening 17 through which the shank 9 of the bolt is adapted to extend. The body portion is notched at its four corners as at 18, 19, 20, and 21 and the notches 18 and 19 accommodate a connecting bar 24 of a double coil raking tooth structure generally designated 25. Bar 24 is connected at opposite ends to the inner coils or loops 26 and 27 of the helical coil springs 28, 29. The coil 26 is accommodated under the end portion 30 of the body portion of the clip and extends through notches 18, 21 and is retained under the end portion whence such end portion is bent downwardly as at 32. Portion 32 overlaps the interior of the coil 26 and holds the exterior edge 34 against the external surface 6 of the wheel. The other coils of the spring 28 also seat against the surface 6 and similarly at the opposite end portion 35 of the body portion of the clip is turned downwardly as best seen at 37 in FIG. 3 and the inner coil 27 is held between said portion 37 against the surface 6 as are the other coils of spring 29 in the manner similar to that described previously in connection with coil 28. The portions 32, 37 are hooked and as best seen in FIG. 6 hold the tooth against movement, that is, axially or circumferentially with respect to the wheel.

The other ends of the coils 28, 29 are provided respectively with outwardly extending teeth 40, 41 and the teeth are raked back or angled opposite to the direction of rotation as shown by the arrow in FIG. 6. The rear lip or flange 14 is adapted to bear on its inner side 43 against the rear edge 44 of the rim 4 and also serves to capture the spring bar 24 between itself and the shank 9 of the bolt assembly 10, the bar being of spring steel is located between the surface 6 and the underside 45 of the body portion 11 and being normally straight is curved to conform to the rim and body portion, thus holding the connecting bar tight.

The flange 15 has upper and lower portions 42 and 48 and the upper portion is offset inwardly with respect to the lower portion 48 whereby the lower portion 48 forms with the external surface 49 of the radial flange 5 a pocket 50 which admits the peripheral edge portion 51 of the composition board annular shield 52. The lower portion 48 is provided with a central inwardly directed projection 53 which is adapted to pierce or indent as at 54 the peripheral edge portion 51 of the board shield 50 attendant to the tightening of bolt 10 securing the clip with the wheel and the rake tooth assembly.

The assembly position of the parts shown in FIG. 8 wherein it will be seen that the clip 12 is disposed in such position that the lower portion 48 of the flange 15 is angled outwardly from the wheel flange 5. As the bolt 10 is tightened the clip is drawn onto the rim 4 and the lower portion 48 swings toward the rim flange 5 whereby pressing the projection 53 into the board 52 to form the dimple 54. Simultaneously the tooth connecting bar is secured between the clip and the wheel rim 4 by the bolt 10.

The instant device has been tested and has been found to not only provide a good connection for the spring teeth but also for connecting the shield and the previous difficulties of having the board split or the openings for the screws breaking out which previously have been used to secure the board 52 to the flange 5, are entirely eliminated. The instant invention also facilitates assembly and disassembly of the parts reducing the cost of manufacture.

DESCRIPTION OF THE STRUCTURE FIGS. 9–12

In this embodiment and parts common to the previously described embodiment will be identified by the same reference numerals.

In this embodiment the clip generally designated 100 comprises a body portion 101 which is of transverse arcuate contour complemental to the contour of the surface 6' of the rim on the wheel against which body portion inner surface 102 is adapted to lie. The body portion comprises a central aperture 103 which admits a bolt 104 therethrough which passes through aperture 7 in the rim 4 of the wheel 2. The body portion 101 has inner and outer flanges 105, 106 at its lateral edges and the flanges 105, 106 have inwardly offset center portions or intermediate portions 107, 108 which diverge in the direction away from the bottom surface 102 and each have an angular relationship in a plane transverse of the bottom wall of about 94°. This accommodates the insertion of the clip onto the wheel rim 4 and facilitates the assembly of the clip with the shield 52, the assembly being similar to that shown in FIG. 8 of the previous embodiment. It will be observed that the inwardly offset portions each are provided with a projection 109 and 110, either of these projections being adapted to indent the board 52 as at 54 depending on how the clip is mounted on the rim.

It will be observed that the clip may be positioned in either position and therefore can be used for right-hand or left-hand turning wheel.

In this embodiment the spring teeth comprised of blocks of elastomer material 112, 113 which are bonded to the upper surface 114 of the body portion 101 at opposite ends thereof. Blocks 112, 113 are molded about the root end portions of the teeth 115, 116 respectively, which are angled away from or opposite to the direction of rotation which is represented by the arrow in FIG. 9. This feature accommodating the shedding of the crops as the wheel makes the upturn on the discharge side is well known to those skilled in the art.

It will be seen that in each embodiment the lip is so structured that upon assembly the projection 109 or 110 or 53 will be pressed into the composition board and thereby fasten the board against rotation or radial displacement and at the same time serves to hold the teeth in proper position on the wheel.

EMBODIMENT OF FIGS. 13–16

In this embodiment parts common with the other embodiments are identified with the same reference numerals.

The clip 150 is the same as clip 12 except that the integral projection 151 on the flange 15 is vertically elongated and is U-shaped in cross section (FIG. 16) comprising portions 152, 153 which provide inwardly converging wedge faces 154, 155. The faces 154, 155 wedge against and deform the edges 156, 157 of a peripheral slot or pocket 158 open through the periphery 159 of the peripheral edge portion 51 of the fiber board cover panel 52' such as "Masonite."

The projections forms an elongated external slot 160 in the external side 161 of flange 15 and has an open bottom end 162.

In application, the projection is registered with the respective slot 158 in the panel 52' and the bolt 9 is tightened thus canting the bracket or clip in a direction swinging the flange against the edge 51 of the panel 52' and pressing it against the flange 5.

Since the panel is held captive about its entire periphery it cannot become loose. It will be appreciated that the projection 151 will indent a fiber board panel at its peripheral edge and that the slots in the panel may be eliminated in the manner of the previous embodiments.

It will be understood that any deformable material may be used for the panels such as plastics.

What is claimed is:

1. For a rotary rake wheel of the type having a skeletal structure comprising a rim with a peripheral annular surface, a radial flange extending inwardly of the rim, and a separate circular crop-guiding shield of deformable material for covering the skeletal frame disposed concentric with the wheel and having an outer edge portion axially registering with said radial flange, the improvement comprising:
   means for securing the shield to the wheel comprising a clip having a base portion adapted to be secured against said peripheral surface of the rim and having along one edge a flange element disposed angularly to said base portion and positionable to extend inwardly of the rim in overlapping relation to the outer edge portion of the shield, means on the flange element of the clip projecting toward the shield, and means for securing the base portion to said rim and drawing said flange element against said edge portion of the shield and deforming the contiguous portion of the shield by forcing the said projecting means on the flange into the shield.

2. The invention according to claim 1 and said clip comprising a second flange element along the other edge of the base portion and said flange elements embracing the rim.

3. The invention according to claim 1 and a block of elastomer material secured to said base portion and projecting radially outwardly of the wheel, and a metalic rake tooth having a root end imbedded in said material and an outer end extending outwardly of the block.

4. The invention according to claim 2 and said securing means comprising a nut and bolt assembly and radially alignable openings in the rim and base portion receiving said bolt therethrough and said bolt having a head superposed over the body portion and the nut being threaded on the bolt and engaging the interior of the rim.

5. The invention according to claim 4 and a spring tooth assembly having a pair of coils and a bar interconnecting adjacent ends of the coils, the bar disposed between the bolt and the second flange element and embraced between the body portion and external surface of the rim, and teeth on the remote ends of said coils extending generally radially outwardly of the wheel.

6. The invention according to claim 2 and said other flange element being shorter than the first mentioned element.

7. The invention according to claim 1 and said body portion being arcuate circumferentially of the wheel for complemental engagement with said peripheral surface.

8. The invention according to claim 7 and said securing means comprising a bolt and nut assembly extending through an aperture in the body portion intermediate its ends and an aligned radial opening in the rim, and rake teeth mounted at opposite ends of the body portion.

9. The invention according to claim 8 and each tooth having an anchor portion of elastomer material secured to said body portion.

10. For a rotary rake wheel of the type having a skeletal structure comprising a rim with a peripheral annular surface, a radial flange extending inwardly of the rim, and a separate circular crop-guiding shield of deformable material for covering the skeletal frame disposed concentric with the wheel and having an outer edge portion axially registering with said radial flange, the improvement comprising:
   means for securing the shield to the wheel comprising a clip having a base portion adapted to be secured against said peripheral surface of the rim and having along one edge a flange element disposed angularly to said base portion and positionable to extend inwardly of the rim in overlapping relation to the outer edge portion of the shield, means on the flange element of the clip projecting toward the shield, and means for securing the base portion to said rim and drawing said flange element against said edge portion of the shield and interlocking with the contiguous portion of the shield by forcing the said projecting means on the flange toward said shield.

11. The invention according to claim 10 and said shield having an aperture in alignment axially of the wheel and said projecting means being integral with the flange and extending into said aperture.

12. The invention according to claim 10 and said projecting means comprising an upset portion of the flange and said edge portion of the shield having a pocket snugly receiving said projecting means therein.

13. The invention according to claim 10 and said projecting means providing a wedge surface opposing said edge portion of the shield and having wedging engagement therewith.

14. The invention according to claim 10 and said wedge surface pressed into engagement with the edge portion of the shield at the outer periphery thereof.

* * * * *